Patented Feb. 27, 1951

2,543,345

UNITED STATES PATENT OFFICE 2,543,345

METHOD OF PREPARING GLUTAMIC ACID AMIDES

Coy Webster Waller, Nanuet, and Robert Bruce Angier, Pearl River, N. Y., assignors to American Cyanamid Company, New York, N. Y., a corporation of Maine No Drawing. Application April 25, 1949, Serial No. 89,556

7 Claims. (Cl. 260—482)

The present invention relates to a process of preparing derivatives of glutamic acid. More particularly, it relates to the preparation of glutamic acid amides from the corresponding pyrrolidone carboxylic acid amides.

Recent publications, particularly in the medical literature, describe pteroylglutamic acid, commonly called folic acid, as active in the treatment of anemias, sprue and other diseases of the circulatory system. Also derivatives of pteroylglutamic acid, such as pteroylglutamic acid polypeptides, are described as having biological activity. The activity in many cases depends upon the configuration of the polypeptide portion of the molecule. For this and other reasons it is desirable to have a method of preparing polypeptides having as a portion of the molecules glutamic acid, to which other amino acids are attached by peptide linkages.

We have found that these peptides can be prepared by opening the ring of an 1-2-pyrrolidone-5-carboxamide or derivatives thereof. The reaction which takes place can be illustrated by the following equation:

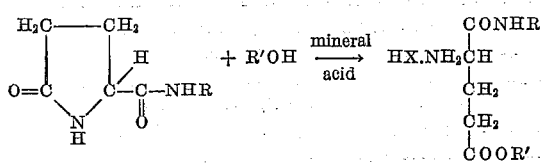

in which R may be hydrogen or the group NHR the radical of an amino acid or peptide thereof and R' is an alkyl radical.

The intermediates used in carrying out the process of the present invention can be prepared by reacting an ester of 1-2-pyrrolidone-5-carboxylic acid with hydrazine to form the hydrazide which is then reacted with an alkali metal nitrite and a mineral acid to form the corresponding azide which is reacted with an amino acid or peptide thereof, as shown in the examples. Practically any amino acid can be used in preparing the intermediates of the present invention. The amino acids which applicants have found particularly useful are the polycarboxylic amino acids such as glutamic acid, aspartic acid, aminomalonic acid, hydroxyglutamic acid, alpha-aminoadipic acid, alpha-aminopimelic acid and peptides thereof. The preferred amino acid is glutamic acid and peptides thereof such as glutamyl-glutamic acid.

As illustrated above the process of the present invention is capable of preparing the alpha- amino acid or peptide thereof derivatives of glutamic acid. In a copending application, Serial Number 2,334, filed January 14, 1948, now Patent No. 2,524,422, we disclosed a method of preparing glutamic acid peptides which was particularly suitable for preparing the gamma derivatives. In the case of glutamic acid, these methods are therefore capable of preparing either the alpha or the gamma peptide where the configuration is definitely known and the product not contaminated with other isomeric forms.

The process of the present invention is preferably carried out in a solvent such as an aliphatic alcohol i. e. methanol, ethanol, propanol, isopropanol, butanol, isobutanol and the like. The product obtained in the reaction has an ester on the gamma-carboxyl radical corresponding to the solvent used, as indicated in the equation above.

The reaction is preferably carried out by heating the reactants under substantially anhydrous conditions in an alcoholic solvent at a temperature of from 15° C. to about 120° C. for a period of from 5 minutes to about 2 hours, depending upon the temperature used. Good results have been obtained by heating the reactants at the refluxing temperature of the various solvents.

The reaction is carried out in the presence of substantially anhydrous mineral acids such as hydrogen chloride, hydrogen bromide, sulfuric acid, phosphoric acid, etc.

The products can be recovered as such, however, we prefer to recover them as the para-nitrobenzoyl derivatives by reacting the products with para-nitrobenzoyl chloride. They are easily crystallizable and after reduction of the nitro group to an amino group can be reacted with an alpha,beta-dihalopropionaldehyde and 2,4,5-triamino-6-hydroxypyridine to produce pteroyl-alpha-glutamylglutamic, pteroyl-alpha-glutamyl-glutamylglutamic acid and similar compounds.

The following examples show the preparation of the unsubstituted amide and di- and tri-peptides of glutamic acid. It is to be understood, however, that similar peptides containing one molecule of glutamic acid joined in the alpha position to other amino acids or derivatives thereof by a peptide linkage can be prepared by corresponding methods as well as higher polypeptides.

Example 1

One hundred grams (100) of 1-2-pyrrolidone-5-carboxamide was suspended in 650–700 cc. of absolute ethanol containing 37.5 grams of dry hydrogen chloride. This was refluxed for 30 minutes, and then filtered hot to remove the ammonium chloride, which had crystallized out. The filtrate was well cooled, the crystalline product filtered off, washed with ethanol and ether, and dried. A yield of 50 grams (30%) of ethyl isoglutaminate was obtained. A small amount of this product was recrystallized twice from absolute ethanol. Long needle-like crystals were obtained, having a melting point of 193°–194° C.

Example 2

Two hundred and sixteen grams (216) of ethyl-2-pyrrolidone-5-carboxylate was dissolved in 500 cc. of absolute ethanol and 70 cc. (1 mole) of 100% hydrazine hydrate was added. This was warmed slightly (about 40° C.) and then allowed to stand at room temperature for 24 hours (it was seeded after standing 4 hours). It was cooled in the refrigerator over the weekend, the product collected, washed with ethanol and ether and air-dried. The 1-2-pyrrolidone-5-carboxylic acid hydrazide was recrystallized from 1 liter of absolute ethanol; yield after drying, 150 grams (77%).

Seventy-five grams (75) of the hydrazide prepared above was dissolved in 125 cc. of water and cooled in an ice-salt bath. To this, 95 cc. of concentrated hydrochloric acid was added while stirring and keeping the temperature below 10° C. Then, with vigorous stirring, a solution of 33 grams of sodium nitrite in 75 cc. of water was added dropwise, keeping the temperature below 5° C. The azide which was formed was very soluble in water, and much less soluble in organic solvents; therefore, it could not be extracted in the usual manner. The water solution of the azide was then added slowly to a mixture of 161 grams of crude diethylglutamate and 200 grams of sodium bicarbonate in 400 cc. of water, keeping the temperature between 5°–10° C. This was warmed to 20° C. and stirred for 1 hour. After standing at room temperature for 48 hours, the excess sodium bicarbonate was filtered off and potassium carbonate added until two layers separated. This was seeded and cooled overnight in the refrigerator. The crystalline product was filtered off, washed with ether, and air-dried. It was suspended in 500 cc. of absolute ethanol, brought to reflux, and filtered to remove inorganic salt. The filtrate was evaporated to about 75 cc. and 350 cc. of ether was added. The product crystallized out, and after cooling well, was filtered off, washed, and dried. This product was suspended in 500 cc. of ethyl acetate, brought to reflux and filtered. Upon cooling, the diethyl-alpha-(1-2-pyrrolidone-5-carboxamido) - glutarate crystallized out; yield, 30.5 grams (20%). Melting point after drying, 127°–129° C.

Four grams (4.0) of diethyl-alpha-(1-2-pyrrolidone-5-carboxamido)-glutarate was suspended in 10 cc. of absolute ethanol and 4 cc. of ethanol containing .15 gram per cc. of hydrogen chloride was added. This was refluxed for 1 hour and then evaporated under reduced pressure to a syrup. About 20 cc. of ethyl acetate was added to dissolve the syrup and it was cooled overnight in the refrigerator. A few milligrams of impurities was filtered off and another 5 cc. of ethyl acetate and 2.0 grams of triethylamine were added. The resulting triethylamine hydrochloride was filtered off and ethyl acetate added to a volume of 40 cc. To this, 4.3 grams of para-nitrobenzoyl chloride was added and the reaction allowed to proceed. After standing for 2 hours it was cooled well, filtered, washed with ethyl acetate, and then washed thoroughly with water. The resulting solid was washed with ether and dried. A yield of 3.5 grams (54%) of triethyl-para-nitrobenzoyl-alpha-glutamylglutamate was obtained. This was recrystallized from 35 cc. of absolute ethanol; yield 2.7 grams (42%). Melting point, 144°–146° C.

Example 3

A mixture of 23.3 grams of diethyl-alpha-(1-2-pyrrolidone-5-carboxamido)-glutarate and 80 cc. of absolute ethanol containing 3.5 grams of dry hydrogen chloride was refluxed on a steam bath for 1 hour. The solution was filtered through diatomaceous earth and the filtrate was evaporated to thick syrup under reduced pressure. This was dissolved in ethyl acetate, and evaporated to dryness again. The syrup, triethyl-alpha-glutamylglutamate hydrochloride, was dissolved in 40 cc. of water containing 30 grams of sodium bicarbonate. To the solution was added 50 cc. of a second solution containing the azide prepared from 7.25 grams of 2-pyrrolidone-5-carboxylic acid hydrazide, prepared as described in Example 2. This was stirred for 3 hours at room temperature, during which time a crystalline product appeared. It was cooled in the refrigerator, collected in a funnel, and dried. The crude product was suspended in 150 cc. of absolute ethanol, which was brought to reflux and filtered to remove inorganic salts. The alcohol was evaporated under reduced pressure to give a syrup which was redissolved in 50 cc. of ethanol. After the addition of 50 cc. of ether and strong cooling, a crystalline product appeared; yield 5.3 grams. This was recrystallized from 45 cc. of absolute ethanol; yield 3.8 grams (11%) of ethyl-gamma - (2-pyrrolidone-5-carboxamido)-N-(1,3-dicarbethoxypropyl)-glutaramate, which softened at 117° C. and melts at 133°–135° C.

A mixture of 3.5 grams of ethyl-gamma-(2-pyrrolidone-5-carboxamido)-N- (1,3 - dicarbethoxypropyl)-glutaramate and 15 cc. of absolute ethanol containing 0.34 gram of dry hydrogen chloride was refluxed for 1 hour. The solution was evaporated to a syrup under reduced pressure, redissolved in ethyl acetate, evaporated again, and finally dissolved in 30 cc. of ethyl acetate. This material, tetraethyl-alpha-glutamyl-alpha-glutamylglutamate, was treated with 1.5 cc. of triethylamine, filtered and 3.5 grams of para-nitrobenzoyl chloride was added to the filtrate. The mixture was allowed to stand at room temperature for 2 hours and cooled in the refrigerator overnight. The product was collected; washed well with water, dried and then recrystallized from 15 cc. of absolute ethanol; yield, 1.5 grams (29%); melting point, 113°–115° C. An analysis for carbon, hydrogen, and nitrogen agreed closely with the theoretical values for tetraethyl-para-nitrobenzoyl-alpha - glutamyl - alpha - glutamylglutamate.

This compound can be obtained in two forms, having different melting points. The product described above is the lower-melting form. A portion of the compound was recrystallized several times from an ethanol-water solution containing enough water to allow crystallization while the solution was still warm. It was seeded each time with some of the higher-melting form. The product melted at 147°–148° C., and a mixed melting point with some of the material prepared previously by another method was 146°–148° C.

We claim:
1. A method of preparing compounds having the general formula:

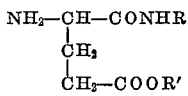

wherein the radical NHR is a member of the group consisting of an amino radical, amino acid radicals and peptides thereof and R' is an alkyl radical which comprises reacting together a compound having the formula:

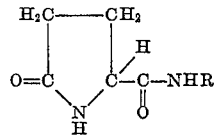

wherein the radical NHR is as defined above, and a substantially anhydrous mineral acid in the presence of an aliphatic alcohol.

2. A method of preparing compounds having the general formula:

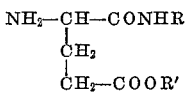

wherein the radical NHR is an amino acid radical and R' is an alkyl radical which comprises reacting together a compound having the formula:

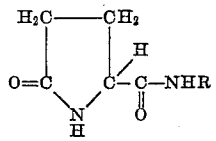

wherein the radical NHR is as defined above, and a substantially anhydrous mineral acid in the presence of an aliphatic alcohol.

3. A method of preparing a trialkyl ester of alpha-glutamylglutamic acid which comprises reacting together a dialkyl ester of alpha-(1-2-pyrrolidone-5-carboxamido) glutaric acid and a substantially anhydrous mineral acid in the presence of an aliphatic alcohol.

4. A method of preparing a tetraalkyl ester of alpha-glutamyl-alpha-glutamylglutamic acid which comprises reacting together an alkyl ester of gamma-(2-pyrrolidone-5-carboxamido-N-(1,3-dicarbalkoxypropyl)-glutaramic acid and a substantially anhydrous mineral acid in the presence of an aliphatic alcohol.

5. A method of preparing triethyl-alpha-glutamylglutamate which comprises reacting together under substantially anhydrous conditions diethyl-alpha-(1-2-pyrrolidone-5-carboxamido)-glutarate and hydrogen chloride in the presence of ethanol.

6. A method of preparing tetraethyl-alpha-glutamyl-alpha-glutamylglutamate which comprises reacting together under substantially anhydrous conditions ethyl-gamma-(2-pyrrolidone-5-carboxamido) - N - (1,3 - dicarbethoxypropyl)-glutaramate and hydrogen chloride in the presence of ethanol.

7. A method of preparing ethyl isoglutaminate which comprises reacting together under substantially anhydrous conditions 1-2-pyrrolidone-5-carboxamide and hydrogen chloride in the presence of ethanol.

COY WEBSTER WALLER.
ROBERT BRUCE ANGIER.

REFERENCES CITED

The following references are of record in the file of this patent:

Beilstein, 4th ed., vol. 22, pages 284-285 (1935).
Wilson et al.: Jour. Biol. Chem., 119, 309-331 (1937).